United States Patent [19]

Abe et al.

[11] Patent Number: 4,619,598
[45] Date of Patent: Oct. 28, 1986

[54] DOUGH FORMING DEVICE USED FOR MANUFACTURING CAKES

[75] Inventors: Kazuo Abe, Fukuoka; Akira Shimamura, Kokubunji, both of Japan

[73] Assignee: Nisshin-DCA Foods Inc., Japan

[21] Appl. No.: 780,800

[22] Filed: Sep. 27, 1985

[30] Foreign Application Priority Data

Feb. 8, 1985 [JP] Japan .............................. 60-16732[U]

[51] Int. Cl.⁴ ......................... A21C 3/04; A21C 11/18
[52] U.S. Cl. .................................. 425/131.1; 425/288
[58] Field of Search ...................... 425/287, 288, 131.1, 425/98

[56] References Cited

U.S. PATENT DOCUMENTS

| | | | |
|---|---|---|---|
| 1,709,280 | 4/1929 | Ost | 425/131.1 |
| 1,947,541 | 2/1934 | Wengel | 425/131.1 |
| 2,669,949 | 2/1954 | Cottingham | 425/287 |
| 2,974,614 | 3/1961 | Buck et al. | 425/287 |
| 3,295,468 | 1/1967 | Belshaw | 425/287 |
| 3,371,625 | 3/1968 | Jones | 425/287 |

Primary Examiner—Willard E. Hoag
Attorney, Agent, or Firm—Larson and Taylor

[57] ABSTRACT

Disclosed is a dough forming device comprising a dough tank, an extrusion member, a cutting member and a separator. The tank has a dough guiding hole with a lower end opening. The extrusion member is moved from the interior of the tank into the guiding hole in order to extrude the dough from the tank through the lower end opening, the extruded dough being expanded radially along the upper surface of the cutting member positioned below the lower end opening. Thereafter, the cutting member is moved to a position in which it is engaged with the lower end opening, so that the expanded dough is cut into an annular body by means of the cutting member. The tank is divided into sector-shaped sections by means of the separator. In case of the sections being filled with doughs of different colors and/or tastes, the expanded and cut body is composed of zones of different colors and/or tastes.

3 Claims, 4 Drawing Figures

FIG. 2
FIG. 3
FIG. 4
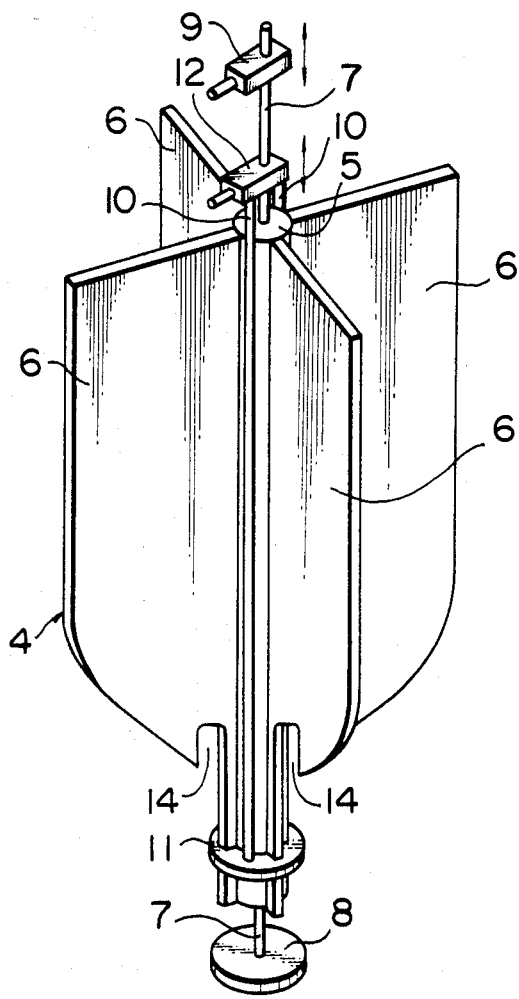
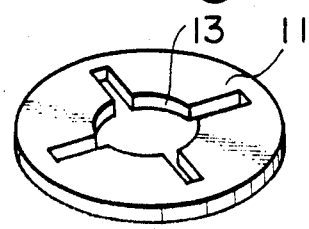
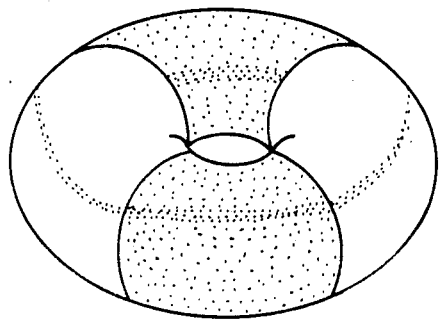

DOUGH FORMING DEVICE USED FOR MANUFACTURING CAKES

TECHNICAL FIELD

This invention relates to a dough forming device used for manufacturing cakes such as ring doughnuts.

BACKGROUND OF THE INVENTION

As to the above-mentioned dough forming device, in addition to an automatic one utilizing for a mass production, a device for a relatively small lot production is known. This device comprises a dough tank provided with a large-diameter cylindrical dough containing barrel and with a central small-diameter cylindrical portion connected to the bottom of the barrel, said cylindrical portion being formed with a dough guiding hole, an extrusion member being downward movable from the interior of the barrel into the hole for extruding the dough, a cutting member being upward movable from a position in which it is positioned below the lower end opening of the hole to another position in which it is engaged with the lower end opening, and drive means for moving vertically the extrusion and cutting members. The dough extruded from the lower end opening of the hole by the downward movement of the extrusion member is expanded outwards along the upper surface of the cutting member into a circular shape, and this expanded dough is cut off into a ring shape by the upward movement of the cutting member. It is normal that a cam mechanism operated by a handle is mounted on a stand for supporting the dough tank and that said members is vertically moved by transmitting the movement of the cam mechanism to the members at a predetermined timing, the cam mechanism and handle constituting said drive means.

However, tastes of demanders are recently variegated, even foodstuffs tend to follow the fashion at present, and even ring doughnuts should be desirably varied in appearance and/or taste.

In the conventional dough forming device, the taste of the dough can be adjusted, but the device cannot produce a variety of dividing one doughnut into a plurality of various tasted sections, and has a limit in variation of the taste.

SUMMARY OF THE INVENTION

Accordingly, it is an object of the invention to provide a dough forming device for forming a dough capable of producing a cake such as a ring doughnut sectioned into two or more portions of different tastes and/or colors.

To achieve the object, there is provided according to the invention: in a dough forming device comprising a dough tank with a dough guiding hole, said hole having a lower end opening, a disc-shaped extrusion member being downward movable from the interior of the tank into the guiding hole, a disc-shaped cutting member being upward movable from a position in which it is positioned below the lower end opening to another position in which it is engaged with the lower end opening, and drive means for moving vertically the extrusion and cutting members, the downward movement of the extrusion member causing a volume of the dough to be expanded from the lower end opening along the upper surface of the cutting member, the upward movement of the cutting member causing the expanded volume of the dough to be cut off into a ring shape: the improvement wherein a separator for partitioning the interior of the dough tank inclusive of the dough guiding hole into a plurality of sector-shaped sections is arranged in the tank.

It is preferable that the separator is composed of a boss arranged in the tank and blades radially extending from the boss, the shapes of the outer edges of the blades being generally coincident to the shape of the inner surface of the tank.

It is still preferable that the cutting member is fixed to one end of a rod-shaped operator passed through the boss, and the other end of the operator is engaged with the drive means.

According to the dough forming device of the invention, in case of the sector-shaped sections in the tank being filled with doughs of different colors and/or tastes, a ring-shaped mass of dough being composed of zones of different colors and/or tastes is produced. Thereafter, the ring-shaped mass is fried in oil to produce a ring doughnut which is also composed of zones of different colors and/or tastes. Thereby, additional merit of the cake such as a ring doughnut according to the various tastes and/or decorative effect is obtained.

Moreover, the dough forming device according to the invention can be constructed by adding a separator to the previously known and existing dough forming device. This point is also a great advantage of the invention.

BRIEF DESCRIPTION OF THE DRAWINGS

The above and other objects, features and advantages of the present invention will become more readily apparent from the following description, reference being made to the accompanying drawings in which:

FIG. 2 is a perspective of an extruding and forming mechanism including a separator and arranged within the dough tank;

FIG. 3 is a perspective of an extrusion member; and

FIG. 4 is a perspective of an annular doughnut produced from a mass of dough formed by the device according to the invention.

DETAILED DESCRIPTION OF THE PREFERRED EMBODIMENTS

Figure 1:
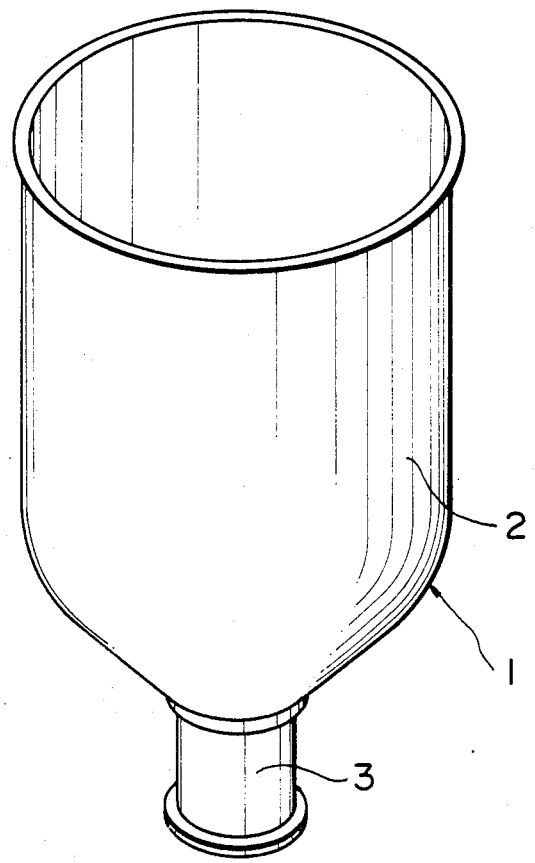
FIG. 1 is a perspective of a dough tank.

Numeral 1 designates a dough tank having a large-diameter dough containing barrel 2 and a central small-diameter cylindrical portion 3 which is connected to the bottom of the barrel 2 via a smoothly curved surface. A dough guiding hole is formed in the cylindrical portion 3. Normally, the tank 1 is supported by a stand (not shown) in the position shown in the FIG. 1.

FIG. 2 shows an extruding and forming mechanism including a separator 4 and arranged within the tank 1. The separator 4 in this embodiment is so formed that four blades 6 positioned perpendicular to each other extend from a central fine-diameter shaft 5 radially and outwards in four directions in such a manner that the shapes of the outer edges of the blades 6 are generally coincident to the shape of the inner surface of the tank 1. The blades 6 are extended from the barrel 1 to the lower end opening of the dough guiding hole i.e. the lower end opening of the tank 1. Thus the interior of the dough tank 1 inclusive of the dough guiding hole are partitioned by the blades 6 into four sector-shaped sections.

Numeral 7 designates a rod-shaped operator passed vertically through the boss 5 of the separator 4. The operator 7 has a disc-shaped cutting member 8 secured to its lower end and a projection 9 secured to its top end. The projection 9 is engaged with a cam mechanism (not shown). The operator 7 is so arranged that the cutting member 8 is movable upward from a steady position in which it is disposed slightly below the lower end opening of the tank 1 to a position in which it is engaged with the peripheral edge of the lower end opening of the tank 1 in the conventional manner.

Numerals 10 designate another operator composed of two rods, which operator has a disc-shaped extrusion member 11 secured to its lower end and a projection 12 secured to its upper end. The projection 12 is engaged with the cam mechanism (not shown) in the same manner as the projection 9 for the cutting member 8. When the extrusion member 11 is moved downward from the interior of the barrel 2 into the dough guiding hole of the tank 1, a volume of the dough is extruded. Further, the member 11 is formed with a cross-shaped opening 13 as shown in FIG. 3, into which opening the lower section of the separator 4 is inserted as shown in FIG. 2, thereby the member 11 is freely movable upward or downward. A notch 14 formed in the separator 4 allows the member 11 to move upward into the barrel 2.

In operation, said sector-shaped sections in the dough tank 1 are filled with doughs of different colors and/or tastes. If the extrusion member 11 is downward moved from the interior of the tank 1 into the guiding hole formed in the cylindrical portion 3, while the cutting member 8 is held in the steady position in which it is disposed below the lower end opening of the tank 1, then the doughs in said sector-shaped sections are extruded from the tank 1 through the lower end opening of it, adhered to each other so as to form one mass and expanded radially along the upper surface of the cutting member 8. Thereafter, when the cutting member 8 is upward moved from said steady position to another position in which it is engaged with the lower end opening, the expanded mass of the doughs is cut off into a ring shape.

The ring-shaped mass is, thereafter, fried in oil to produce a ring doughnut as shown in FIG. 4, this ring doughnut being composed of four zones of different colors and/or tastes.

It is noted that the number of the blades 6 and therefore the number of sections in the tank 1 are not limited to the four as described above, but can be two or more.

What is claimed is:

1. In a dough forming device comprising a dough tank with a dough guiding hole, said hole having a lower end opening, a disc-shaped extrusion member being downward movable from the interior of the tank into the guiding hole, a disc-shaped cutting member being upward movable from a position in which it is positioned below the lower end opening to another position in which it is engaged with the lower end opening, and drive means for moving vertically the extrusion and cutting members, the downward movement of the extrusion member causing a volume of the dough to be expanded from the lower end opening along the upper surface of the cutting member, the upward movement of the cutting member causing the expanded volume of the dough to be cut off into a ring shape, the improvement wherein a separator for partitioning the interior of the dough tank inclusive of the dough guiding hole into a plurality of sector-shaped sections is arranged in the tank.

2. A dough forming device according to claim 1 wherein the separator is composed of a shaft arranged in the tank and blades radially extending from the shaft, the shapes of the outer edges of the blades being generally coincident to the shape of the inner surface of the tank.

3. A dough forming device according to claim 1 wherein the cutting member is fixed to one end of a rod-shaped operator passed through the shaft, and the other end of the operator is engaged with the drive means.

* * * * *